United States Patent
Kanagasabai et al.

(10) Patent No.: US 12,519,897 B2
(45) Date of Patent: Jan. 6, 2026

(54) METHODS AND SYSTEMS FOR ADDING ONE OR MORE SECURITY PATTERNS IN DOCUMENTS

(71) Applicant: XEROX CORPORATION, Norwalk, CT (US)

(72) Inventors: Rajasekar Kanagasabai, Chennai (IN); Sainarayanan Gopalakrishnan, Chennai (IN); Vignesh Doss, Palanichettipatti (IN)

(73) Assignee: XEROX CORPORATION, Norwalk, CT (US)

( * ) Notice: Subject to any disclaimer, the term of this patent is extended or adjusted under 35 U.S.C. 154(b) by 246 days.

(21) Appl. No.: 18/530,511

(22) Filed: Dec. 6, 2023

(65) Prior Publication Data

US 2025/0193329 A1    Jun. 12, 2025

(51) Int. Cl.
*H04N 1/32* (2006.01)

(52) U.S. Cl.
CPC ..... *H04N 1/32267* (2013.01); *H04N 1/32309* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,934,845 B2 * | 8/2005 | Carro | G06F 40/103 713/181 |
| 2003/0068068 A1 * | 4/2003 | Kim | G06T 1/0028 382/100 |
| 2003/0202678 A1 * | 10/2003 | Silverstein | H04N 1/32219 382/100 |
| 2013/0335783 A1 * | 12/2013 | Kurtz | G06K 1/121 358/3.28 |
| 2015/0023582 A1 * | 1/2015 | Smith | G06V 30/2253 382/139 |

FOREIGN PATENT DOCUMENTS

CN    101119429 A  *  2/2008
EP    1136903 B1  *  4/2007  ........... G06F 40/163

* cited by examiner

*Primary Examiner* — Ted W Barnes
(74) *Attorney, Agent, or Firm* — MH2 Technology Law Group LLP

(57) ABSTRACT

The present disclosure discloses methods and systems for adding security patterns in a document submitted at a multi-function device. The method includes receiving the document at the multi-function device from a user, wherein the document includes at least textual content. Further, the method includes obtaining stamping information, wherein the stamping information includes at least one of: portion information, edge filtering criteria, and pattern information. Thereafter, document is processed to detect edges of the at least textual content. Upon detection, one or more text edges matching the edge filtering criteria are filtered from the detected edges of the at least textual content. Finally, the one or more security patterns are added to the one or more matched text edges, thereby resulting in a stamped document.

28 Claims, 7 Drawing Sheets

METHODS AND SYSTEMS FOR ADDING ONE OR MORE SECURITY PATTERNS IN DOCUMENTS

CROSS-REFERENCE TO RELATED APPLICATIONS

Cross-referenced is commonly assigned, entitled "METHODS AND SYSTEMS FOR DETECTING ONE OR MORE SECURITY PATTERNS IN DOCUMENTS".

TECHNICAL FIELD

The present disclosure relates to the field of document security. More specifically, the disclosure relates to methods and systems for adding one or more security patterns in documents.

BACKGROUND

Organizations and individuals deal with different confidential documents such as legal documents, bank bonds, research data, contract documents, prescriptions, coupons, tickets, invoices, and the like. Various techniques are deployed to prevent these confidential documents from any malicious activity, e.g., counterfeiting, forging, etc. One such technique involves the addition of special security marks such as watermarks, barcodes, QR codes, or the like, in the documents.

However, in most of such techniques, the security mark and/or its location is visible to users, i.e., the location/position of the security mark is visible to the users, if not completely at least partially. Due to this, the chances of duplication of the security mark increase thus making the confidential document exposed to malicious activities. Moreover, in most of such techniques complex processing is involved and few even require special scanners to detect the security marks and verify the genuineness/authenticity of the confidential documents. Sometimes, organizations use special patterns to secure their documents, however, the process remains non-user-friendly.

In this light, there is a need for improved systems and methods that are user-friendly, allow easy detection while copying or scanning documents, and add a strong layer of security to the documents.

SUMMARY

According to aspects illustrated herein, a method for adding one or more security patterns in a document submitted at a multi-function device is disclosed. The method includes receiving the document at the multi-function device from a user, wherein the document includes at least textual content. Further, the method includes obtaining stamping information, wherein the stamping information includes at least one of: portion information, edge filtering criteria, and pattern information. Thereafter, a pre-defined operation is performed to detect edges of the at least textual content. Upon detection, one or more text edges matching the edge filtering criteria are filtered from the detected edges of the at least textual content. Finally, the one or more security patterns are added to the one or more filtered text edges, thereby resulting in a stamped document.

According to further aspects illustrated herein, a multi-function device for adding one or more security patterns in a document submitted at the multi-function device is disclosed. The multi-function device includes a receiver for receiving the document at the multi-function device from a user, wherein the document includes at least textual content. The multi-function device also includes a controller for obtaining stamping information, wherein the stamping information includes at least one of: portion information, edge filtering criteria, and pattern information. Further, the multi-function device includes an edge detection module for performing a pre-defined operation to detect edges of the at least textual content. The multi-function device additionally includes a stamping module for: upon detection, identifying one or more edges of the textual content on which the one or more security patterns are to be added, based on the stamping information; and adding the one or more security patterns to the one or more identified edges of the textual content, thereby resulting in a secure document.

According to additional aspects illustrated herein, a method for adding one or more security patterns in a document submitted at a multi-function device is disclosed. The method includes receiving the document at the multi-function device from a user, wherein the document includes at least textual content. The method further includes obtaining stamping information, wherein the stamping information includes at least one of: an edge angle, an edge size and an edge intense. Thereafter, a portion of the document having the at least textual content is extracted and a pre-defined operation is performed to detect edges of the at least textual content. Then, one or more text edges of the at least one textual content matching the edge angle are identified. Once identified, one or more text edges of the identified one or more text edges matching the edge size are further filtered. Thereafter, the one or more text edges of the filtered one or more text edges matching the edge intense are furthermore filtered. Finally, the one or more security patterns are added around the one or more filtered text edges of the at least textual content, thereby resulting in a stamped document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
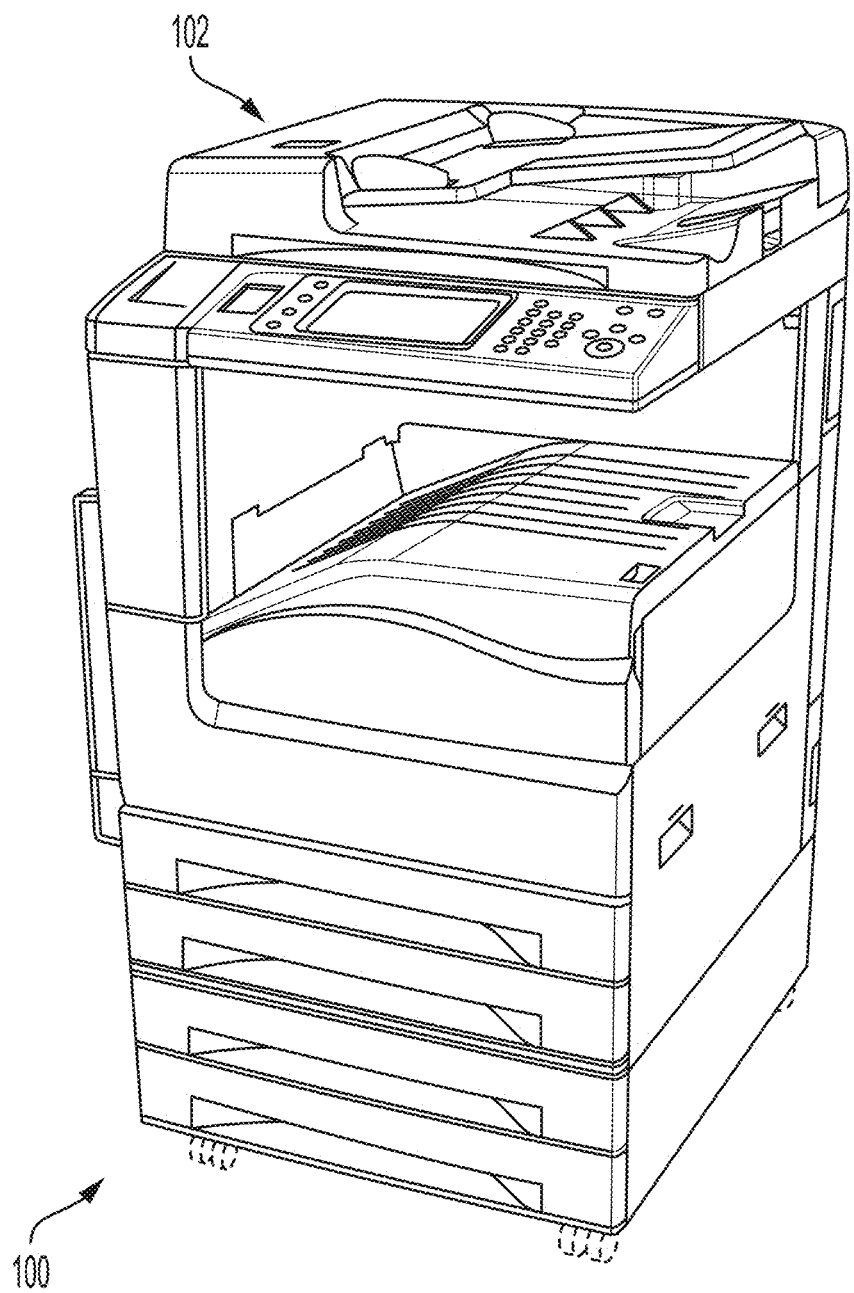
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, scanning, copying, imaging, or the like. The multi-function device may include software, hardware, firmware, or a combination thereof. In the context of the current disclosure, the multi-function device adds one or more security patterns in documents submitted at the multi-function device. Specifically, the multi-function device adds one or more color dot patterns around edges of one or more texts of the documents.

The term "document" refers to any document having confidential information or otherwise confidential for individual users, organizations, nations, or the like. Various examples of such confidential documents may be, but not limited to, cheques, legal documents, bank bonds, research data, contract documents, prescriptions, coupons, tickets, invoices, or disclosure documents. The document may include content in the form of text, images, graphics, or a combination thereof. The document can be in physical form such as printed on paper or can be in digital form.

The term "stamping information" refers to information related to one or more security patterns to be added, specifically information related to the color dot pattern to be added around the edges of texts (text edges) of the document. The stamping information includes portion information, edge filtering criteria and pattern information. The term "portion information" refers to include information related to a particular portion of a document where security patterns are to be added. The information can be in the form of coordinates of a particular portion of the document. The term "edge filtering criteria" refers to various factors based on which one or more edges of the texts/characters are identified for adding the security patterns. A few examples of the edge filtering criteria include edge angle, edge size, edge intense or width/thickness of the edge, or the like. The edge filtering criteria "edge angle" indicates the angle of an edge. In one example, the edge angle indicates an angle the edge makes with the horizontal. The edge filtering criteria "edge size" indicates the size of an edge. In one example, the edge size can be the area/dimension (length*width) of an edge. The edge size is measured in terms of number of pixels. The edge filtering criteria "edge intense" indicates intense, i.e., the width or thickness of the edge to add the security pattern and it is also measured in terms of number of pixels. The term "pattern information" refers to information related to the color of the security pattern/dots and the shape/pattern of the security dots. Further, the stamping information can be obtained from the user or can be obtained from the memory of the multi-function device, where pre-defined stamping information is stored in advance. The user can provide the stamping information while submitting the document by simply inputting one or more values corresponding to different stamping information or by selecting one or more pre-stored templates. In the former scenario, the stamping information is obtained from the user, and in the latter scenario, the stamping information corresponding to the user-selected template is obtained from the memory. Additionally, in case of pre-defined stamping information, the user does not provide the stamping information. In such a scenario, once a user submits a document for stamping, the pre-stored stamping information is obtained from the memory and used for further processing.

The term "security patterns" refers to one or more color dot patterns that are added around the edges of one or more characters of textual content selected by the user and/or otherwise selected. In one example, the security patterns are added based on primary colors, i.e., Cyan (C), Magenta (M), Yellow (Y), Black (K), of CMYK format. The process of adding color dot patterns to text edges can be referred to as edge stamping, resulting in an output document that can be termed/referred as a stamped document.

The term "predefined operation" refers to include any known or later developed edge detection techniques applied on the submitted document to detect edges of the different types of content in the submitted document.

The term "stamped document" refers to an output document obtained after adding one or more security patterns in the document.

The term "pre-defined templates" refers to one or more templates including information related to the stamping information or the security patterns/color dot patterns to be added. The information includes portion information, edge filtering criteria and pattern information. Each pre-defined template includes pre-defined values/information corresponding to the portion information, different factors of edge filtering criteria, and pattern information. Further, the templates can be defined by the user or can be pre-stored on the multi-function device. The templates can be defined by the user and/or by an organization and/or an admin user.

The term "pattern" refers to a pattern formed by two or more color dots on the text edges. The pattern may be a line, or a pattern/shape that fits the edge constraints.

The term "text edge" represents an edge of a character (i.e., alphabets) of the textual content. Each text, specifically each character has one or more text edges and the text edges can be filtered based on edge angle (i.e., the angle that the text edge makes with the horizontal), edge size (i.e., size/dimension/area of the edge) and the intense value (i.e., intense or width/thickness of the text edge).

For easy understanding, all detection operations are performed on text edges of text content, where text represents a character in the textual content.

The term user "refers" to include any user who submits the document at the multi-function device and/or an admin user. This user knows/understands text edges angles, size, intense, or other information relevant for implementing the present disclosure. In some implementations, the user obtains information through other ways such as other users.

Overview

The present disclosure discloses methods and systems for adding one or more security patterns such as dot patterns in documents. Specifically, the methods and systems add the security patterns around edges of one or more texts of the document such that the security patterns are not visible to the naked eye. According to the disclosure, first, stamping information is obtained which includes information related to one or more security patterns to be added in a document submitted at the multi-function device. Thereafter, based on the obtained stamping information, one or more edges of texts/characters present in the document are identified and once identified, a security pattern, i.e., a pattern of color dots is added on the identified edges of the textual content. This way, the methods and systems add security patterns around the text edges such that the security patterns are hidden and not visible to the naked eye.

Exemplary Environment

FIG. 1 shows an exemplary environment 100 in which various embodiments of the disclosure can be practiced. The environment 100 includes a multi-function device 102 that provides one or more functionalities such as printing, scanning, imaging, and so on. The multi-function device 102 as shown is just one example but the environment 100 may include scanners, printers, or any devices with scanning/printing functionalities. In the context of the current disclosure, the multi-function device 102 adds security patterns in documents. Specifically, the multi-function device 102 adds one or more security patterns including color dot patterns around the edges of one or more texts of the documents such that the security patterns are hidden and not visible through the naked eye.

The documents submitted can be any document belonging to the user, confidential or otherwise. The document includes content such as texts, images, graphics, or a combination thereof. Few examples of confidential documents include cheques, legal documents, bank bonds, research data, contract documents, prescriptions, coupons, tickets, invoices, disclosure documents, and the like.

In implementation, a user submits a document at the multi-function device 102. The document can be in a physical form, such as printed on paper, or can be in a digital form. The digital form/version can be submitted from a computing device (not shown) of the user and the physical form/version can be submitted directly at the multi-function device 102. For easy understanding, the disclosure is explained with respect to a scenario where the user submits the document for scanning, and in such cases, the user is required to submit the physical version of the document. Thereafter, stamping information is obtained, which includes information related to one or more security patterns to be added in the document. In detail, the stamping information includes portion information, edge filtering criteria and pattern information.

Once the document is received and scanned, the multi-function device 102 segments the document into a text portion and an image portion, where the image portion includes non-textual content such as images, background, etc., and the text portion includes textual contents of the document. Once segmented, the multi-function device 102 extracts the text portion from the received document and performs edge detection. Then, the multi-function device 102 identifies textual content for adding the security patterns based on the obtained stamping information. Specifically, the multi-function device 102 identifies one or more edges of the texts/characters based on portion information and various edge filtering criteria/factors such as angle of text/character edge, size (dimension/area) of the text/character edge, intense or width/thickness value of the edge for adding the security patterns. Once identified, the multi-function device 102 adds the security patterns on the identified edges of the texts/characters using the pattern information. This way, the multi-function device 102 adds the security patterns to the documents, thereby resulting in a stamped document.

Exemplary System

Figure 2:
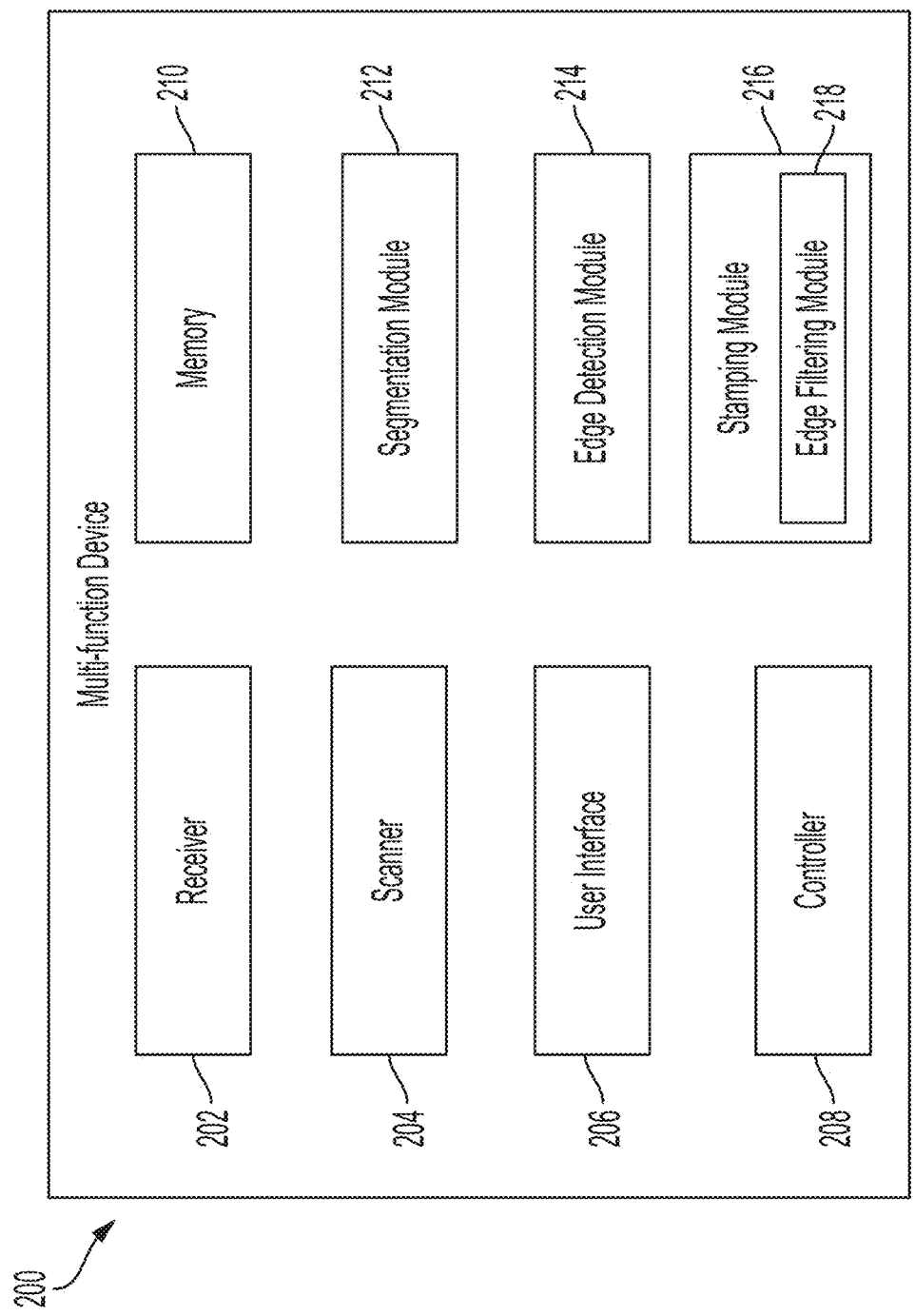
FIG. 2 is a block diagram illustrating various components of a multi-function device, in accordance with an embodiment of the present disclosure.

FIG. 2 is a block diagram illustrating various components of a multi-function device 200 for implementing the current disclosure. As shown, the multi-function device 200 includes a receiver 202, a scanner 204, a user interface 206, a controller 208, a memory 210, a segmentation module 212, an edge detection module 214, and a stamping module 216, which further includes an edge filtering module 218. Although, the segmentation module 212, the edge detection module 214 and the stamping module 216 are shown as independent modules, however, it is understood that the modules 212, 214, and 216 can be integral components of the controller 208, and all the functionalities of the modules 212, 214, and 216 or its sub-module 218 can be performed by the controller 208 without departing from the scope. The components 202-218 are connected to each other via a conventional bus or a later-developed protocol. And the components 202-218 communicate with each other for performing various functions of the present disclosure. The multi-function device 200 may further include additional component(s) as required to implement the present disclosure.

Figure 3A:
FIGS. 3A and 3B illustrate exemplary snapshots of documents, in accordance with an embodiment of the present disclosure.

Initially, a user wishing to add security patterns in a document submits a document at the multi-function device 200. The document includes texts, images, infographics, etc. One such exemplary snapshot of a confidential document 300 is shown in FIG. 3A. As illustrated, the document 300 includes confidential content such as text, images, etc. The document can be a physical document or a digital document. The user can submit the digital document from his computing device (not shown). Further, the user can submit the physical document directly at the multi-function device 200, specifically at the receiver 202 such as an automatic document handler or a platen of the multi-function device 200. For easy understanding, the disclosure is discussed with respect to the physical document, but it is understood that the disclosure is applicable to digital documents as well.

Post submitting the document, the user accesses the user interface 206. Once accessed, the user interface 206 displays multiple options such as scan, print, workflow, copy, fax, and so on. In the context of the current disclosure, the user interface 206 displays a new option, say "secure stamp" option. The option allows the user to secure the document by adding one or more security patterns such that no other user can copy or tamper the content of the document. The user can enable or disable the option. Enabling the option allows the user to add security patterns in the document and disabling the option allows the user to proceed with conventional ways, i.e., without adding the security pattern in the document. Further, by enabling the option, the user can provide input to indicate that the user wishes to secure the document or add the security pattern in the document. In the context of the current disclosure, the user enables the secure stamp option. Once selected, the multi-function device 200, specifically, the controller 208 obtains stamping information which includes information related to one or more security patterns to be added in the document. In detail, the stamping information includes portion information, edge filtering criteria, and pattern information.

The portion information includes information related to a particular portion of a document where stamping is to be performed. The information may further include coordinates of the particular portion, say a top portion (e.g., between 1st to 10th line), a middle portion (e.g., 10th to 25th line), a lower portion (e.g., after 25th line) in the document. The edge filtering criteria include various factors based on which one or more edges of the texts/characters are identified for the addition of the security pattern. Edge filtering criteria include edge angle, edge size, edge intense, etc. The edge filtering criteria "edge angle" indicates an angle of an edge of a text/character (alphabet) and the value can be measured with respect to the horizontal. Exemplary values of the edge angles are 30 degrees, 45 degrees, 60 degrees, etc. The edge filtering criteria further include "edge size" which indicates the size of the edge, specifically the size (or dimension/area) of the edge of a text to add the security pattern and it is measured in terms of number of pixels. Exemplary values of the edge size are 40 pixels, 50 pixels, and so on. The edge filtering criteria "edge intense" indicates the intense or width/thickness of an edge, specifically width/thickness of the edge of a text for adding the security pattern or dot pattern, and it is also measured in terms of number of pixels. Exemplary intense values are 9 pixels, 10 pixels, 11 pixels, and so on. The pattern information includes information related to color of the security patterns and shape/pattern of the security dots to be added. In one example, the color of the security patterns can be selected from primary colors such as four possible colors including cyan, magenta, yellow, and black. In one example, the color of the security patterns is selected based on the color of the background (background of the text/character) or color of the text, i.e., if the color of the text is black, then the magenta color is selected as the color for the security pattern. Further, the pattern information includes information related to shape/pattern of the color dots. The portion information, edge filtering criteria, pattern information, etc., together constitute the stamping information.

Further, the stamping information can be obtained from the user or can be obtained from the memory 210 of the multi-function device 200, where pre-defined stamping information is stored in advance as pre-defined templates. In the former scenario, the user interface 206 displays multiple options when the user selects the "secure stamp" option. The displayed options allow the user to provide the portion information, various edge filtering criteria/factors and pattern information related to the security pattern to be added. In one example, the user interface 206 displays individual options to allow the user to separately provide/input information related to the portion of the document (i.e., portion information), edge filtering criteria, and pattern information. Once provided, the controller 208 obtains the stamping information provided by the user and temporarily stores it for further processing. In another example, the user interface 206 displays one or more pre-defined templates, where each template includes pre-defined portion information, pre-defined values corresponding to each edge filtering criteria, and pre-defined pattern information. The templates can be defined by the user such as an admin user, or can be pre-stored at the multi-function device 200, specifically, memory 210. Further, the values/information corresponding to different information, i.e., portion information, edge filtering criteria, and pattern information, can be defined by the user and/or by an organization and/or by an admin user. Once different templates are displayed, the user can select a pre-defined template as an input. Once selected, the controller 208 obtains the stamping information corresponding to the user-selected template from the memory 210 and temporarily stores it for further processing. This way, the user can provide input for the addition of the security patterns. Once provided, the controller 208 temporarily stores the stamping information provided by the user or the stamping information corresponding to the user-selected template. Thereafter, the user initiates further processing, say by selecting a scan option.

In the latter scenario, the user does not provide the stamping information, instead, pre-defined stamping information pre-stored in the memory 210 is obtained and used for further processing. For this, the pre-defined stamping information is pre-stored in the memory 210 and the values/information corresponding to different information can be defined by the user and/or by an organization and/or by an admin user. And, the pre-defined stamping information stored in the memory 210 is used for the stamping of the document. In one example, once the user selects the "secure stamp" option, the controller 208 obtains the pre-defined stamping information stored in the memory 210 and temporarily stores it for further processing. Thereafter, the user initiates further processing, say by selecting a scan option.

Once selected, the controller 208 triggers the scanner 204 to scan the document. Once triggered, the scanner 204 scans the documents and generates scanned data. The scanned data generated here refers to raw scanned images generated post scanning without implementing any image processing techniques. Once generated, the controller 208 sends the scanned data to the segmentation module 212.

Once received, the segmentation module 212, first segments the received scanned data into one or more layers. The one or more layers may include an image layer and one or more text layers. The one or more layers are generated based on the content in the scanned data. The image layer includes the background and non-textual content, while the text layer includes all textual content. Then, the text layers or content in the text layers are sent to edge detection module 214.

Figure 3B:

The edge detection module 214 performs one or more edge detection techniques on the text layers and identifies edges of the textual content. One such exemplary snapshot of the document 302 including edges of the textual content and objects detected by the edge detection module 214 is shown in FIG. 3B. The document 302 is generated when the edge detection operation is performed on the document 300 as shown in FIG. 3A. This way, the edge detection module 214 performs the edge detection on the text layer and generates a document/file including edges of texts/characters. Once generated, the document is then sent to the stamping module 216 for further processing.

The stamping module 216 receives the document. Further, the stamping module 216 obtains the stamping information from the controller 208. Here, the stamping information can be the stamping information obtained from the user, the stamping information corresponding to the user-selected template, or the pre-defined stamping information.

Once obtained, based on the analysis of the stamping information, specifically the portion information, the stamping module 216 identifies the portion where the security patterns are to be added. Once identified, the stamping module 216 extracts the portion where one or more security patterns are to be added. For instance, if the portion information is the middle portion, then the stamping module 216 only obtains the specific segment/portion, i.e., the middle portion of the document (obtained after the edge detection). For easy understanding, the disclosure is discussed with respect to a scenario where the portion information indicates a particular portion of the document and accordingly the portion of the document is selected. However, it is understood that the disclosure can be implemented for scenarios where the portion information does not specify any particular portion of the document.

Once the required portion is extracted, the stamping module 216, specifically the edge filtering module 218 processes the extracted portion based on the edge filtering criteria, i.e., edge angle, edge size and edge intense value and identifies the one or more edges for adding the security patterns. To accomplish this, the edge filtering module 218, first, filters the text edges (included in the extracted portion) based on the edge filtering criteria "edge angle". Then, the filtered text edges are further filtered based on the edge filtering criteria "edge size". Once further filtered, the filtered edges (i.e., edges obtained after the "edge size" based filtering) are yet again filtered based on the edge filtering criteria "edge intense" and the filtered text edges are identified for further processing.

In detail, first, the edge filtering module 218, filters the text edges based on the edge filtering criteria "edge angle". Here, the edge filtering module 218 compares the edge angle value included in the obtained stamping information with the angle of text edges present in the extracted portion. Upon comparison, the edge filtering module 218 identifies the text edges matching the angle value as included in the obtained stamping information. For instance, if the value of the edge angle in the obtained stamping information is 45 degrees angle, then all the edges of the textual content having an angle of 45 degrees are considered for further processing, and the remaining text edges are discarded/not considered for further analysis. This way, the edge filtering module 218 identifies all text edges matching the edge angle included in the obtained stamping information. Once all the text edges matching angle criteria are identified, the edge filtering module 218 filters the text edges based on the edge filtering criteria "edge size". Here, the size (dimension/area) of the identified text edges (i.e., edges identified after the angle comparison) is compared with the edge size as included in the obtained stamping information, and accordingly, the text edges are filtered. For instance, if the edge size included in the obtained stamping information is 40 pixels, then all the text edges for which the size is 40 pixels are considered for further processing, and the remaining text edges are discarded. This way, the edge filtering module 218 identifies all text edges matching the edge angle and the edge size included in the obtained stamping information.

Once the text edges matching edge size criteria are identified, the edge filtering module 218 further filters text edges based on the edge filtering criteria "edge intense". Here, the intense or width/thickness of the text edges is compared with the intense value included in the obtained stamping information, and accordingly, the text edges are further filtered. For instance, if the value of the edge intense included in the obtained stamping information is 10 pixels, then all the text edges are kept for which the intense of the text edge is 10 pixels and all the remaining text edges are discarded/not considered. This way, the edge filtering module 218 identifies all text edges matching the edge angle, the edge size and edge intense value included in the obtained stamping information, and the text edges matching these criteria are considered for further analysis.

Once identified, the stamping module 216 adds one or more color dot patterns on the identified text edges based on the pattern information included in the obtained stamping information. For instance, if the pattern information indicates that the pattern is a line and the color of the security dots is magenta, then the stamping module 216 adds magenta-colored dots on the identified text edges such that the pattern of the text edge forms a line. In another example, if the pattern information indicates that the pattern is a line and the color of the security dots is Cyan, then the stamping module 216 adds Cyan-colored dots on the identified text edges such that the pattern of the text edge forms a line. This way, the stamping module 216 adds the security patterns to text edges by adding color dot patterns based on the pattern information included in the obtained stamping information. Thereafter, the stamping module 216 adds the stamped text edges corresponding to the textual content back to the text layer and generates an updated text layer. The updated text layer includes one or more stamped text edges i.e., text edges having security patterns. Thereafter, the stamping module 216 combines the updated text layer and the image layer as originally obtained and generates a final scanned document. The final scanned document is sent to the controller 208 which displays the document to the user on the user interface 206. Once displayed, the user can take any desired action, such as print, etc. In further examples, the scanned document can be sent to one or more destinations such as a cloud storage location, network, server, portable storage device, email, or the like.

Continuing with FIG. 2 description, although the user interface 206 as shown in FIG. 2 is a part of the multi-function device 200, but the user interface 206 can be an external display or device that can be connected to the multi-function device 200. Further, the user interface 206 displays various options and/or information to the user for implementing the present disclosure. For example, the user interface 206 displays various options such as "enable secure stamp", final scanned document, or other options. In a further example, the user interface 206 can be used to receive input such as edge filtering criteria, portion/location information, pattern information, scan attributes, destination, or the like.

The memory 210 stores all relevant information required for implementing the current disclosure. For example, the memory 210 temporarily stores the document, scanned data, scan attributes or other information relevant for implementing the present disclosure. In the context of the current disclosure, the memory 210 stores information related to the edge filtering criteria, portion/location information, and pattern information. Further the memory 210 stores one or more predefined templates that include information, i.e., edge filtering criteria, portion/location information, pattern information, etc., required for adding the security patterns to one or more text edges. Any details stored in the memory 210 may be retrieved by the stamping module 216, the controller 208 or other components for implementing the current disclosure.

Exemplary Snapshots

Figure 4A:
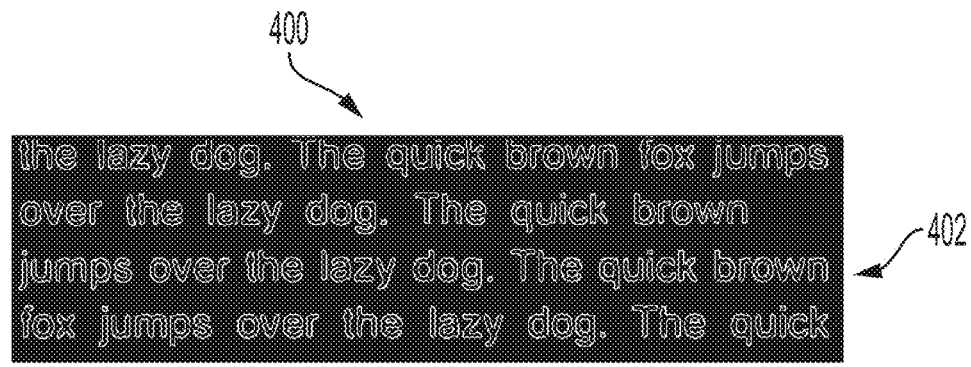
FIGS. 4A-4D are exemplary snapshots, in accordance with an embodiment of the present disclosure.
Figure 4B:
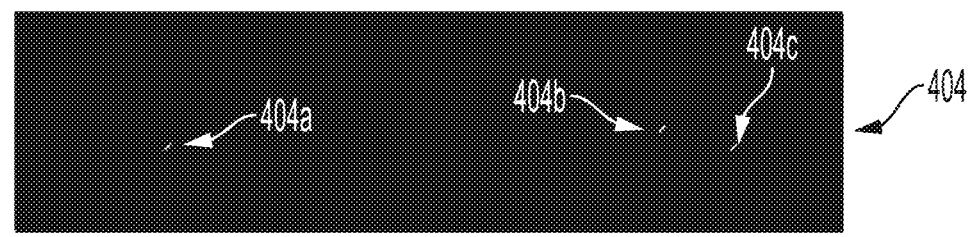
Figure 4C:

FIG. 4A illustrates an exemplary snapshot 400 of a portion 402 extracted from the document submitted at the multi-function device. The portion 402 includes textual content and their corresponding text edges. The portion 402 is extracted from the document 302, where edges of content are defined/detected, as discussed in FIG. 3B. According to the implementation, when edge filtering criteria are applied, text edges matching edge angle, edge size and edge intense value, are identified. As an example, text edges labeled as 404*a*, 404*b*, 404*c* identified based on the obtained stamping information are shown in snapshot 404 of FIG. 4B. Textual content 406*a*, 406*b* and 406*c* corresponding to the identified text edges 404*a*, 404*b* and 404*c*, respectively are shown in the snapshot 406 of FIG. 4C.

Figure 4D:
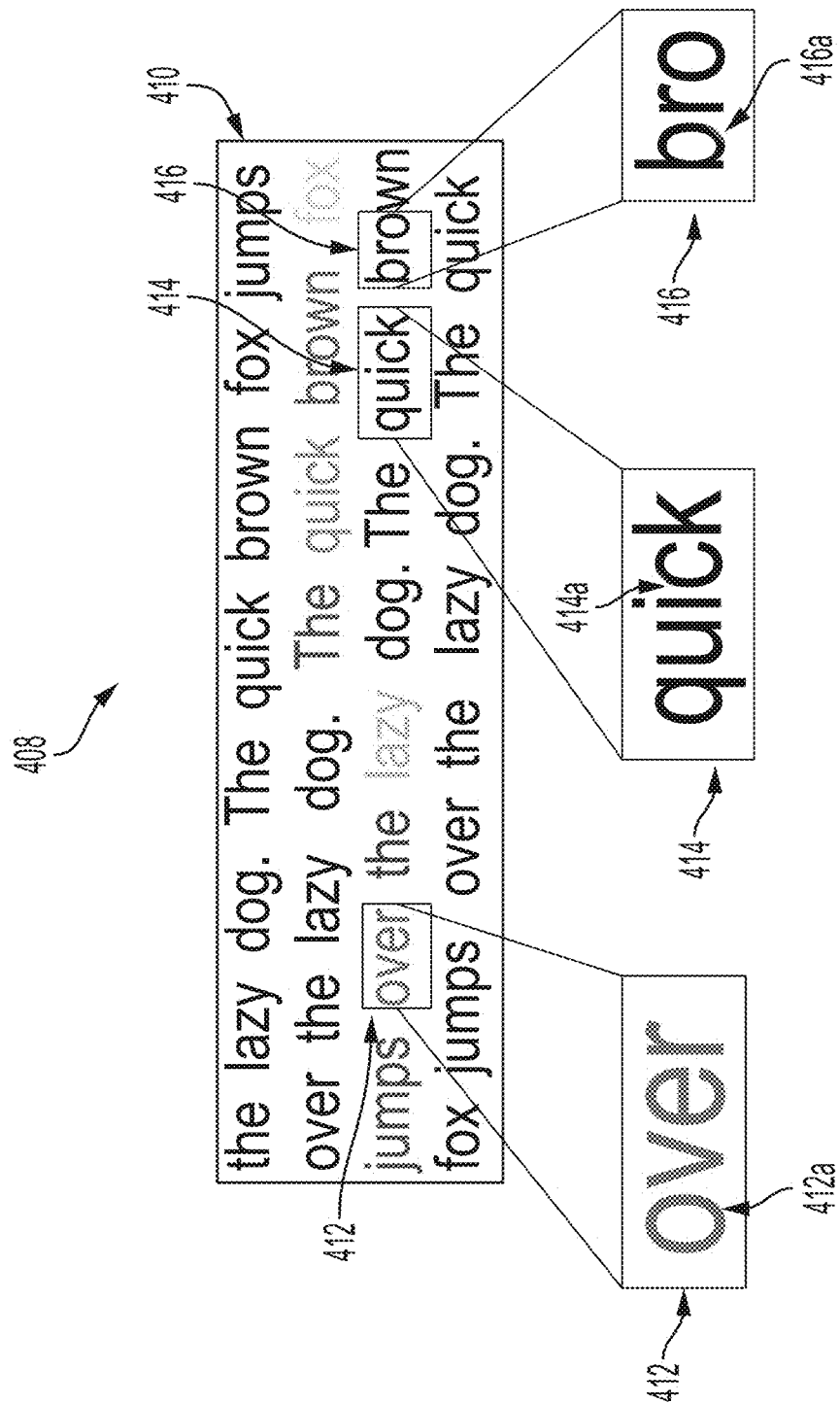

FIG. 4D is an exemplary snapshot 408 illustrating an output document 410 obtained after adding security patterns or an output document with stamped textual content. The output document 410 includes color dot patterns added on text edges of textual content. As illustrated, the textual content labeled as 412 includes a security pattern on the edge 412*a*. Similarly, the textual content 414 and 416 include security patterns on the edges 414*a* and 416*a*, respectively. The textual content 412 includes magenta-colored dots on its edge (of character 'o'). Similarly, the textual contents 414 and 416 include magenta-colored dots on their edges (of characters 'c' and 'b' respectively).

Exemplary Flowchart

Figure 5:
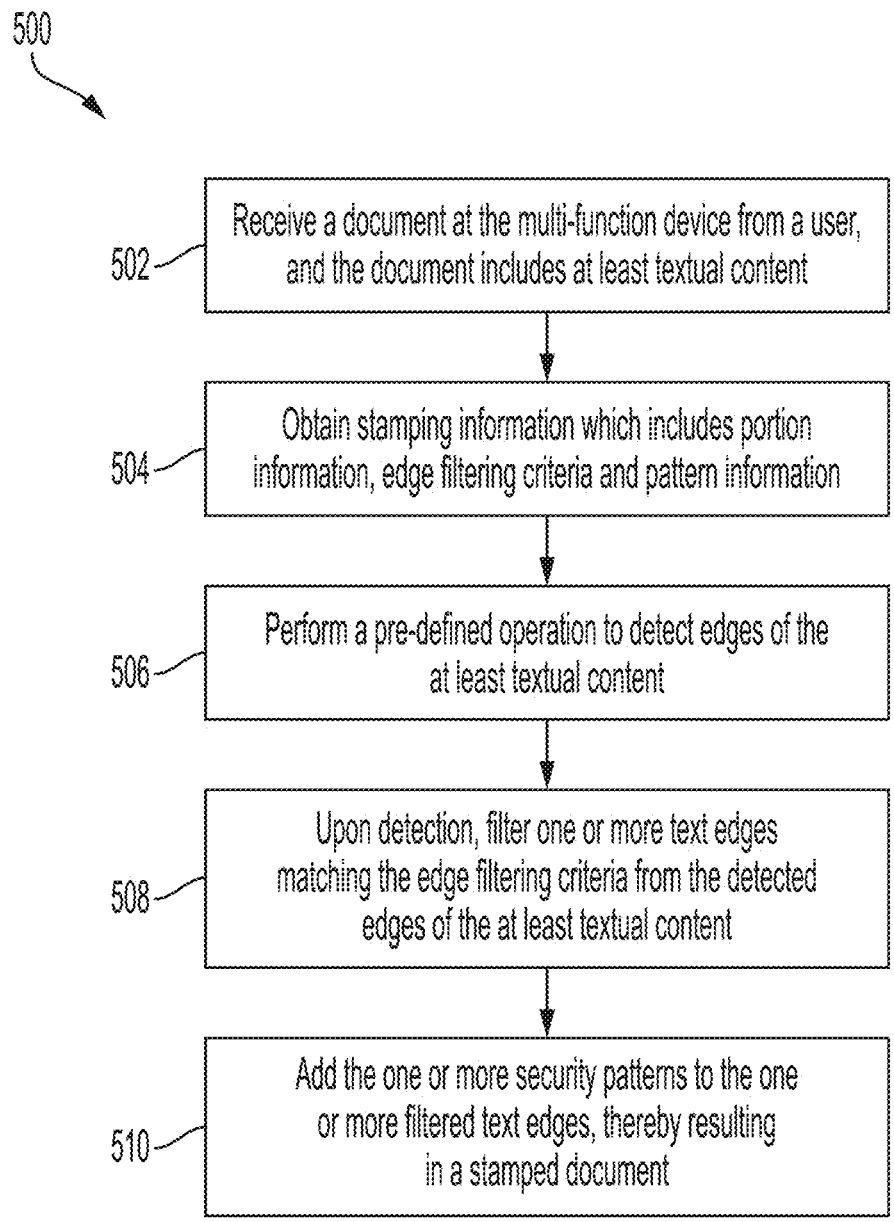
FIG. 5 illustrates a method flowchart for adding one or more security patterns to a document submitted at a multi-function device, in accordance with an embodiment of the present disclosure.

FIG. 5 is a method 500 for adding security patterns in documents. The method 500 may be implemented at a multi-function device, such as the multi-function device 102 of FIG. 1, the multi-function device 200 of FIG. 2. However, the method 500 can be implemented at any equivalent device with functionalities such as printing, scanning, and so on.

The method 500 begins when a user wishing to add security patterns in a document submits the document at the multi-function device.

Once submitted, at 502, the document is received from the user and the document includes textual content. In one example, the document includes texts, images, infographics, etc. The document is submitted for scanning. Once submitted, multiple options such as scan, print, workflow, copy, fax, and so on, are displayed to the user. In the context of the current disclosure, a new option, say "secure stamp" option is displayed to the user. The option allows the user to secure the document by adding one or more security patterns such that no other user can copy or tamper the content of the document. The user can enable or disable the option. In the context of the current disclosure, the user enables the secure stamp option.

Once enabled, at 504, stamping information is obtained. The stamping information can be obtained from the user or can be obtained from the memory of the multi-function device which stores the pre-defined stamping information in advance as a template. Further, the stamping information includes portion/location information, edge filtering criteria and pattern information. The portion information includes information related to a particular portion of a document where the stamping is to be performed. The information may further include coordinates of the particular portion, say a top portion, (e.g., between the 1st line to 10th line), a middle portion, (e.g., 10th line to 25th line), a lower portion, (e.g., after the 25th line) in the document. The edge filtering criteria includes information related to various factors based on which one or more edges of the texts/characters are identified. Edge filtering criteria include edge angle, edge size, edge intense, etc. The edge filtering criteria "edge angle" indicates the angle of the edge of a text/character, i.e., text edge, and the value is measured with respect to the horizontal. Exemplary values are 30 degrees, 45 degrees, 60 degrees, etc. The edge filtering criteria "edge size" indicates the size (or dimension/area) of the edge and it is measured in terms of number of pixels. Exemplary values of the size are 40 pixels, 50 pixels, and so on. The edge filtering criteria "edge intense" indicates the intense or width/thickness of the text edge to accommodate the security pattern and it is also measured in terms of number of pixels. Exemplary intense values include 9 pixels, 10 pixels, 11 pixels, and so on. The pattern information includes information related to the color of the security pattern/dot and shape/pattern of the security dots. In one example, the color of the security dots can only be selected from primary colors, i.e., the security dots can only have four possible colors, e.g., cyan, magenta, yellow, and black. Further, the color of the security dots can be selected based on the color of the background (background of the text/character) or color of the text, for example, if the color of the text is black, then the color of the dots can be magenta. The pattern information includes information related to shape/pattern of the color dots, exemplary pattern can be a line.

After providing the input on the addition of the security patterns or after enabling the new option, i.e., the secure stamp option, the user initiates further processing, say by selecting a scan option. Once selected, the document is scanned and scanned data/digital data is generated. Thereafter, the scanned data/digital data is processed to obtain edges of the plurality of texts of the document. To accomplish this, the scanned data is segmented into one or more layers such as an image layer and one or more text layers. The image layer includes the background and non-textual content, while the text layer includes the textual content.

Once segmented, at 506, a pre-defined operation is performed to detect edges of the textual content, i.e., an edge detection operation is performed on the text layer and a document/file including edges of texts/characters is generated.

Once generated, at 508, one or more text edges matching the edge filtering criteria are filtered from the detected edges of the at least textual content. In detail, first, based on the analysis of the obtained stamping information, specifically the portion information, the portion/location of the document where the security patterns are to be added is identified. Thereafter, the identified portion of the document (i.e., the document obtained after edge detection) is obtained. Once obtained, the portion of the document is processed based on the edge filtering criteria and one or more edges of text are identified for adding the security patterns. To accomplish this, first, texts or text edges are filtered based on the edge filtering criteria "edge angle". Thus, the text edges that comply with the edge angle value included in the obtained stamping information are retained and the remaining text edges are discarded. Here, the edge angle value included in the obtained stamping information is compared with the angle of different text edges present in the portion, and the text edges with same or similar edge angle are identified. Once all the text edges matching angle criteria are identified, the identified texts/text edges are further filtered based on edge size. Here, the size (or dimension/area) of the identified text edges (i.e., text edges identified after the angle comparison) is compared with the edge size value included in the obtained stamping information, and accordingly, the text edges are filtered. For instance, if the edge size included in the obtained stamping information is 60 pixels, then all the text edges are kept for which the edge size is 60 pixels and all the remaining texts/text edges are discarded/not considered for further processing. Once the text edges matching the edge filtering criteria "edge size" are identified, the identified text edges are further filtered based on the edge intense value. Here, the intense or width/thickness of the text edges is compared with the intense value included in the obtained stamping information, and accordingly, the text edges are filtered. For instance, if the intense value included in the obtained stamping information is 10 pixels, then all the text edges are kept for which the intense value, i.e., width/thickness of the text edge is 10 pixels and all the remaining text edges are discarded/not considered. This way, one or more text edges matching edge filtering criteria, i.e., the edge angle, edge size and edge intense value included in the obtained stamping information are identified for further processing and the remaining edges/text edges are discarded.

Once identified, at 510, one or more security patterns are added to the one or more filtered text edges. In detail, color dot patterns are added on the filtered/identified text edges based on the obtained stamping information. For instance, if the obtained stamping information indicates that the pattern is a line and the color of the security dots is magenta, then magenta-colored dots are added on the identified edges such that the pattern of the edge forms a line. Once added, a stamped document including security patterns on the one or more text edges is generated. In detail, post addition, an updated text layer is generated that includes one or more stamped text edges, i.e., text edges having security patterns. Thereafter, the updated text layer is combined with the image layer to generate a stamped document. This way, the security patterns are added around the edges of the texts to ensure the security of the document.

The methods and systems focus on identifying textual content having text edges at specific angles, size, and intense, and adding security patterns on those identified text edges. Specifically, the methods and systems add security patterns to one or more characters of the textual content that have text edges at specific angle, specific size, and intense.

The methods and systems provide a simple and effective approach to add the security patterns in documents. The methods and systems perform edge stamping or add security patterns on filtered characters/objects in the document. Further, the methods and systems provide flexibility such that security patterns can be added based on range, area, angle, size, intense and/or based on the user's need/preferences. The secure stamps would be retained/transferred between digital and print media. The methods and systems provide a new way to hide information in the printed documents.

The present disclosure discloses methods and systems for adding security patterns, i.e., color dot patterns in documents. Specifically, the methods and systems add color dot patterns around the edges of one or more texts of the document such that the color dot patterns are not visible through the naked eye and this makes the security pattern non-forgeable and tamper-proof. Thus, the methods and systems offer enhanced security. The security patterns can be added to any section of the document, say top portion, middle portion, lower portion, etc., of the document. Thus, the methods and systems provide a user-friendly, less computation-intensive, and simple approach to add the security pattern to the document. The methods and systems allow users, say admin users to define one or more templates for adding security patterns. The methods and systems add security patterns such that they are hidden, as a result, the content of the document is not much affected, and this further enhances the user experience.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, extracting, adding, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for adding one or more security patterns in a document submitted at a multi-function device, the method comprising:
   receiving the document at the multi-function device from a user, wherein the document comprises at least textual content;
   obtaining stamping information, wherein the stamping information comprises at least one of: portion information, edge filtering criteria, and pattern information;
   performing a pre-defined operation to detect edges of the at least textual content;
   upon detection, filtering one or more text edges matching the edge filtering criteria from the detected edges of the at least textual content; and
   adding the one or more security patterns to the one or more filtered text edges, thereby resulting in a stamped document.

2. The method of claim 1, wherein the one or more security patterns comprise a color dot pattern.

3. The method of claim 1, further comprising receiving an input from the user related to the addition of the one or more security patterns.

4. The method of claim 3, wherein the user input comprises at least one of: an indication to add the one or more security patterns, the stamping information, and/or selection of a pre-defined template comprising the stamping information.

5. The method of claim 1, wherein the portion information comprises information of a portion of the document where the one or more security patterns are to be added and/or coordinates of the portion.

6. The method of claim 1, wherein the edge filtering criteria comprises at least one of: an edge angle, an edge size, and an edge intense.

7. The method of claim 1, wherein the pattern information comprises at least one of: a shape of the one or more security patterns and a color of the one or more security patterns.

8. The method of claim 7, wherein the one or more security patterns are added based on CMYK (Cyan, Magenta, Yellow and Black) color format.

9. The method of claim 1, wherein performing the pre-defined operation comprises:
   segmenting the received document into one or more textual layers; and
   performing one or more edge detection operations to detect edges of the at least textual content in the one or more textual layers.

10. The method of claim 1, further comprising extracting a portion of the document based on the stamping information for further processing.

11. The method of claim 1, wherein adding the one or more security patterns comprises adding the one or more security patterns to one or more characters corresponding to the filtered text edges of the at least textual content of the document.

12. The method of claim 1, wherein adding the one or more security patterns comprises adding a shape and/or a color to the one or more filtered text edges.

13. The method of claim 1, further comprising, allowing the user to enable a secure stamp option.

14. The method of claim 1, further comprising, storing one or more pre-defined templates comprising the stamping information based on which the one or more security patterns are added.

15. A multi-function device for adding one or more security patterns in a document submitted at the multi-function device, the multi-function device comprising:
   a receiver for receiving the document at the multi-function device from a user, wherein the document comprises at least textual content;
   a controller for obtaining stamping information, wherein the stamping information comprises at least one of: portion information, edge filtering criteria, and pattern information;
   an edge detection module for performing a pre-defined operation to detect edges of the at least textual content;
   a stamping module for:
      upon detection, identifying one or more edges of the at least textual content on which the one or more security patterns are to be added, based on the stamping information; and
      adding the one or more security patterns to the one or more identified edges of the at least textual content, thereby resulting in a secure document.

16. The multi-function device of claim 15, further comprises a user interface for receiving input from the user related to addition of the one or more security patterns.

17. The multi-function device of claim 16, wherein the user input comprises at least one of: an indication to add the one or more security patterns, the stamping information, and/or selection of a pre-defined template comprising the stamping information.

18. The multi-function device of claim 16, wherein the user interface allows the user to enable a secure stamp option.

19. The multi-function device of claim 15, wherein the portion information comprises information of a portion of the document where the one or more security patterns are to be added and/or coordinates of the portion.

20. The multi-function device of claim 15, wherein the edge filtering criteria comprises at least one of: an edge angle, an edge size, and an edge intense.

21. The multi-function device of claim 15, wherein the pattern information comprises at least one of: a shape of the one or more security patterns and a color of the one or more security patterns.

22. The multi-function device of claim 21, wherein the one or more security patterns are added based on CMYK (Cyan, Magenta, Yellow and Black) color format.

23. The multi-function device of claim 15, wherein identifying the one or more edges for adding the one or more security patterns is performed based on at least one of: the portion information and the edge filtering criteria.

24. The multi-function device of claim 15, wherein the stamping module adds the one or more security patterns to one or more characters of the identified edges of the at least textual content of the document.

25. The multi-function device of claim 15, further comprising a memory for storing one or more pre-defined templates based on which the one or more security patterns are added.

26. A method for adding one or more security patterns in a document submitted at a multi-function device, the method comprising:
receiving the document at the multi-function device from a user, wherein the document comprises at least textual content;
obtaining stamping information, wherein the stamping information comprises at least one of: an edge angle, an edge size, and an edge intense;
extracting a portion of the document having the at least textual content;
performing a pre-defined operation to detect edges of the at least textual content;
identifying one or more text edges of the at least one textual content matching the edge angle;
further filtering one or more text edges of the identified one or more text edges matching the edge size;
furthermore filtering one or more text edges of the filtered one or more text edges matching the edge intense; and
adding the one or more security patterns around the one or more filtered text edges of the at least textual content, thereby resulting in a stamped document.

27. The method of claim 26, further comprising, adding one or more security patterns around the one or more filtered text edges of one or more characters of the at least textual content.

28. The method of claim 26, wherein adding the one or more security patterns comprises adding a shape and/or a color to the one or more filtered text edges.

* * * * *